UNITED STATES PATENT OFFICE.

HENRY C. F. MEYER, OF CINCINNATI, NEBRASKA.

MEDICAL COMPOUND.

SPECIFICATION forming part of Letters Patent No. 271,894, dated February 6, 1883.

Application filed December 21, 1882. (No specimens.)

*To all whom it may concern:*

Be it known that I, HENRY CONRAD FREDERICK MEYER, a citizen of the United States, residing at Cincinnati precinct, in the county of Pawnee and State of Nebraska, have invented certain new and useful Improvements in a certain Medicinal Compound; and I do declare the following to be a full, clear, and exact description of the invention, such as will enable others skilled in the art to which it appertains to make and use the same.

My invention is a medicinal compound formed and constituted in the manner and proportions hereinafter stated, and designed as a purifying and cleansing agent for all disorders arising from the impurities of the blood, and also as a healing medium for the alleviation of pain caused by cuts, burns, scalds, bruises, the stings and bites of reptiles, &c.

My compound consists of the following ingredients, combined in the proportions stated, viz: extract of *Echinacea angustifolia*, six and one-half ounces; extract of hop, one ounce; extract of wormwood, one ounce. These ingredients may be either comminuted and united so as to form a powder, or be steeped in brandy, whisky, or any suitable liquid.

In using the compound internally, adults should take one ounce three times a day; children one-half the quantity. The doses and applications, however, may vary with the difficulty or disorder.

The medicine is intended as a veterinary as well as human remedy.

Having described my compound, what I claim as new, and desire to secure by Letters Patent, is—

The herein-described medical compound, consisting of the extract of echinacea, extract of hop, and the extract of wormwood, in the proportions specified.

In testimony whereof I affix my signature in presence of two witnesses.

HENRY CONRAD FREDERICK MEYER.

Witnesses:
 GEO. M. HUMPHREY,
 E. ROBERTS.